(12) United States Patent
Yang et al.

(10) Patent No.: US 8,828,578 B2
(45) Date of Patent: *Sep. 9, 2014

(54) MIDDLE OR LARGE-SIZED BATTERY MODULE OF IMPROVED SAFETY

(75) Inventors: Jae Hun Yang, Daejeon (KR);
Jongmoon Yoon, Daejeon (KR);
Yongshik Shin, Daejeon (KR);
BumHyun Lee, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,529

(22) Filed: May 25, 2012

(65) Prior Publication Data

US 2012/0237808 A1   Sep. 20, 2012

Related U.S. Application Data

(63) Continuation of application No. 12/846,870, filed on Jul. 30, 2010, now Pat. No. 8,206,846, which is a continuation of application No. PCT/KR2010/001960, filed on Mar. 31, 2010.

(30) Foreign Application Priority Data

Apr. 1, 2009   (KR) .......................... 10-2009-0027929

(51) Int. Cl.
*H01M 2/26* (2006.01)
*H01M 2/28* (2006.01)
*H01M 2/08* (2006.01)
*H01M 2/10* (2006.01)
*H01M 10/42* (2006.01)
*H01M 2/34* (2006.01)

(52) U.S. Cl.
CPC .............. *H01M 2/1077* (2013.01); *Y02E 60/12* (2013.01); *H01M 10/425* (2013.01); *H01M 2/34* (2013.01)

USPC .......................................... 429/121; 429/174

(58) Field of Classification Search
USPC ................................................. 429/121, 174
See application file for complete search history.

(56) References Cited

U.S. PATENT DOCUMENTS

| 2,237,562 | A | 4/1941 | Knox, Jr. |
| 5,403,677 | A | 4/1995 | Lundie et al. |
| 6,427,953 | B1 | 8/2002 | Dickens |
| 7,488,201 | B2 | 2/2009 | Yoon et al. |

FOREIGN PATENT DOCUMENTS

| JP | 7-14564 A | 1/1995 |
| JP | 10-112297 A | 4/1998 |
| JP | 2001-57196 A | 2/2001 |
| JP | 2007-317578 A | 12/2007 |
| KR | 10-2007-0112490 A | 11/2007 |
| WO | 2007/102670 A1 | 9/2007 |
| WO | 2007/102672 A1 | 9/2007 |

*Primary Examiner* — Patrick Ryan
*Assistant Examiner* — Julian Anthony
(74) *Attorney, Agent, or Firm* — Birch, Stewart, Kolasch & Birch, LLP (57) ABSTRACT

Disclosed herein is a middle- or large-sized battery module including a plurality of battery cells or unit modules, the middle- or large-sized battery module being configured to have a connection structure in which measured voltage and/or temperature signals of the battery cells or the unit modules are transmitted and received by a wire type connection member, wherein at least one end of the connection member is connected to a connection counterpart in a male and female engagement type mechanical coupling manner, the connection member has a downwardly bent region (a downwardly bent portion) formed at a region adjacent to a connection part such that the downwardly bent portion is bent downward to a height lower than the connection part for preventing moisture condensed on the connection member from being introduced to the connection part due to gravity.

17 Claims, 7 Drawing Sheets

MIDDLE OR LARGE-SIZED BATTERY MODULE OF IMPROVED SAFETY

CROSS REFERENCE TO RELATED APPLICATIONS

This application is a Continuation of U.S. application Ser. No. 12/846,870 filed on Jul. 30, 2010, now U.S. Pat. No. 8,206,846, which is a Continuation of PCT International Application No. PCT/KR2010/001960 filed on Mar. 31, 2010, which claims the benefit of Patent Application No. 10-2009-0027929 filed in Republic of Korea, on Apr. 1, 2009. The entire contents of all of the above applications are hereby incorporated by reference into the present application.

TECHNICAL FIELD

The present invention relates to a middle- or large-sized battery module having improved safety, and, more particularly, to a middle- or large-sized battery module including a plurality of battery cells or unit modules, the middle- or large-sized battery module being configured to have a connection structure in which measured voltage and/or temperature signals of the battery cells or the unit modules are transmitted and received by a wire type connection member, wherein at least one end of the connection member is connected to a connection counterpart in a male and female engagement type mechanical coupling manner, the connection member has a downwardly bent region (a downwardly bent portion) formed at a region adjacent to a connection part such that the downwardly bent portion is bent downward to a height lower than the connection part for preventing moisture condensed on the connection member from being introduced to the connection part due to gravity.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle- or large-sized devices, such as vehicles, use a middle- or large-sized battery module having a plurality of battery cells electrically connected to one another because high power and large capacity are necessary for the middle- or large-sized devices.

Preferably, the middle- or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle- or large-sized battery module. Especially, much interest is currently focused on the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

Meanwhile, a battery module is a structural body including a plurality of battery cells which are combined with each other, with the result that the safety and the operating efficiency of the battery module may be lowered when overvoltage, overcurrent, and overheating occur in some of the battery cells. Consequently, a sensing unit for sensing the overvoltage, overcurrent, and overheating is needed. Specifically, a voltage sensor or a temperature sensor is connected to the battery cells so as to sense and control the operation of the battery cells in real time or at predetermined time intervals.

That is, a wire type connection member is used as a channel for transmitting voltages and temperatures of the battery cells to a battery management system (BMS). The wire type connection member may be implemented by, for example, a bundle of sheathed data cables, at each end of which may be provided a plug or cap type connector.

However, if moisture is formed on the surface of the wire type connection member due to change in temperature of the battery cells during charge and discharge of the battery cells, the moisture on the wire type connection member is introduced to the connection part located at the corresponding end of the wire type connection member along the surface of the wire type connection member due to gravity unless the connectors provided at the ends of the wire type connection member have a waterproof function. As a result, a short circuit may occur at a coupling region between the connection part and the connection counterpart.

Also, the BMS electrically connected to the connection counterpart measures a voltage value of each battery cell. For this reason, accurate sensing is needed, and therefore, it is necessary to provide a wire type connection member of a specific structure that is capable of preventing the occurrence of a short circuit.

Consequently, there is a high necessity for a middle- or large-sized battery module including a wire type connection member of a specific structure that is capable of preventing the occurrence of a short circuit between a coupling region between a connection part and a connection counterpart due to moisture as described above and thus the occurrence of a short circuit in battery cells.

DISCLOSURE

Technical Problem

Therefore, the present invention has been made to solve the above problems, and other technical problems that have yet to be resolved.

Specifically, it is an object of the present invention to provide a middle- or large-sized battery module including a wire type connection member of a specific structure that is capable of preventing the occurrence of a short circuit due to moisture even in a case in which a connection part of the wire type connection member does not have a waterproof function.

It is another object of the present invention to provide a middle- or large-sized battery module having improved safety that is capable of stably sensing voltages and temperatures of battery cells and preventing abnormal deviation between the battery cells.

Technical Solution

In accordance with one aspect of the present invention, the above and other objects can be accomplished by the provision of a middle- or large-sized battery module including a plurality of battery cells or unit modules, the middle- or large-sized battery module being configured to have a connection structure in which measured voltage and/or temperature signals of the battery cells or the unit modules are transmitted and received by a wire type connection member, wherein at least one end of the connection member is connected to a connection counterpart in a male and female engagement type mechanical coupling manner, the connection member has a downwardly bent region (a downwardly bent portion) formed at a region adjacent to a connection part such that the downwardly bent portion is bent downward to a height lower than the connection part for preventing moisture condensed on the connection member from being introduced to the connection part due to gravity.

In the middle- or large-sized battery module according to the present invention, the connection member has the downwardly bent region (the downwardly bent portion) bent downward to a height lower than the connection part, and therefore, it is possible to effectively prevent moisture condensed on the wire type connection member from being introduced to the connection part due to gravity.

Also, it is possible for the connection member to easily prevent the occurrence of a short circuit in the battery cells due to moisture, as described above, without an additional connector having a waterproof function. As a result, it is possible to stably sense temperatures or voltages of the battery cells or the unit modules, and therefore, it is possible to improve safety of the battery module.

The battery module is configured in a structure in which a battery cell stack including a plurality of battery cells or unit modules connected in series to each other while standing in a lateral direction thereof is mounted in a module case. Therefore, it is possible for the module case to safely protect the battery cell stack from external force. The connection counterpart is a portion connected to one end of the connection member. For example, the connection counterpart may be located at a battery management system (BMS) for monitoring and controlling the operation of the battery module.

For example, the connection counterpart may be located at the top of the BMS such that the connection counterpart can be mechanically coupled to one end of the connection member in a male and female coupling manner.

The shape of the downwardly bent portion is not particularly restricted as long as the downwardly bent portion prevents moisture on the connection member from being introduced to the connection part of the connection member due to gravity. For example, the downwardly bent portion may be configured in a semi-elliptical shape on a plane.

Also, the downwardly bent portion may be spaced apart from the connection part by 1 to 10 cm.

If the downwardly bent portion is located at a position excessively near the connection part mechanically coupled to the connection counterpart, a resistance value at the downwardly bent portion is increased, and breakage of the downwardly bent portion due to bending may be occur. On the other hand, if the downwardly bent portion is located at a position excessively remote from the connection part, there is a great possibility that moisture condensed on a wire of the connection member between the downwardly bent portion and the connection part may be introduced not only to the downwardly bent portion but also the connection part, which is not preferable.

According to circumstances, the lower end of the downwardly bent portion may be located at a height 0.5 to 10 cm lower than the connection part to effectively prevent moisture on the connection member from being introduced to the connection part.

If the height difference between the lower end of the downwardly bent portion and the connection part is too small, it may be difficult to prevent moisture from being introduced to the connection part. On the other hand, if the height difference between the lower end of the downwardly bent portion and the connection part is too large, it is possible to preferably prevent the introduction of moisture; however, the length of the connection member is increased, with the result that resistance of the connection member is increased, and space restriction may occur, which is not preferable.

For example, the downwardly bent portion may be configured in a structure in which a first vertical bent point, a horizontal bent point, and a second vertical bent point are continuously disposed. This structure is preferable in that it is possible to easily achieve a desired effect of preventing the introduction of moisture while it is possible to easily bend the connection member.

In the structure as described above, it is preferable for the downwardly bent portion to have a specific radius sufficient to restrain excessive increase in resistance of the wire at the bent points. For example, the bent points may have radii of 0.3 to 3 cm.

In a preferred example, the downwardly bent portion may be surrounded by an insulative band for preventing the downwardly bent portion from being restored to the original state thereof. Therefore, it is possible to effectively prevent moisture on the connection member from being introduced to the connection part as a result of the downwardly bent portion being restored to the original state thereof.

In the structure as described above, the structure of the insulative band is not particularly restricted as long as the insulative band can easily prevent the downwardly bent portion from being restored to the original state thereof. In an example, the insulative band may be configured in a cap shape, an upper part of which is open, for surrounding the downwardly bent portion.

In another example, the insulative band may be configured in a shape of a hollow pipe for surrounding a wire corresponding to the downwardly bent portion. This structure requires a smaller installation space than the insulative band configured in the cap shape, and therefore, the insulative band configured in the hollow pipe shape is more preferable.

In the structure as described above, the insulative band configured in the cap shape or the hollow pipe shape may be filled with a moisture absorbing material, or the moisture absorbing material may be applied to the inside of the insulative band configured in the cap shape or the hollow pipe shape. Therefore, it is possible for the insulative band configured in the cap shape or the hollow pipe shape to more effectively absorb moisture condensed on the outer surface of the downwardly bent portion than an insulative band having no moisture absorbing material filled therein or applied to the inside thereof. Examples of the moisture absorbing material may include silica-based materials and alumina-based materials. As a representative example of the moisture absorbing material, silica gel, to which, however, the present invention is not limited, may be used.

Meanwhile, the connection member is not particularly restricted as long as the connection member is configured in the shape of a wire which can easily be bent. In an example, the connection member may be a wiring harness.

For reference, the wiring harness is normally used as a low-voltage cable for vehicles. The wiring harness is a connection member configured in a structure in which the outside of a conducting wire manufactured by twisting flexible copper wires is covered with a synthetic resin.

Preferably, the end of the connection member is configured in a shape of a plug or cap type connector for connection with the connection counterpart. Consequently, it is possible to easily achieve mechanical coupling between the connection member and the connection counterpart in a male and female coupling manner.

According to circumstances, the connection member may have two or more downwardly bent portions which are continuously formed.

For example, the battery cell stack may include a plurality of unit modules each including plate-shaped battery cells each having electrode terminals formed at an upper end and a lower end thereof, and each of the unit modules may include two or more battery cells configured in a structure in which electrode terminals of the battery cells are connected in series to each other and connections between the electrode terminals are bent, the battery cells being stacked, and a pair of high-strength cell covers coupled to each other for surrounding outsides of the battery cells excluding the electrode terminals of the battery cells.

Each of the plate-shaped battery cells may be a secondary battery having a small thickness and a relatively large width and length sufficient to minimize the overall size when the plate-shaped battery cells are stacked to constitute a battery module. In a preferred example, each of the plate-shaped battery cells may be a secondary battery configured in a structure in which an electrode assembly is mounted in a battery case formed of a laminate sheet including a resin layer and a metal layer, and electrode terminals protrude outward from the upper and lower ends of the battery case. Specifically, each of the plate-shaped battery cells may be configured in a structure in which an electrode assembly is mounted in a pouch-shaped battery case formed of an aluminum laminate sheet. A secondary battery having such a structure may be referred to as a pouch-shaped battery cell.

The pouch-shaped battery case of the pouch-shaped battery cell may be configured in various structures. For example, the case may include two members. An electrode assembly may be mounted in a receiving part formed at the inside of the upper part and/or the lower part of the battery case, and upper and lower contact portions may be coupled to each other in a hermetically sealing manner.

The electrode assembly includes a cathode and an anode, through which the battery cell can be charged and discharged. For example, the electrode assembly may be configured such that a cathode and an anode are stacked while a separator is disposed between the cathode and the anode in a jelly-roll type structure, in a stack type structure, or in a stack/folding type structure. The cathode and the anode of the electrode assembly may be configured in a structure in which electrode tabs of the cathode and the anode directly protrude outward from the battery or in a structure in which electrode tabs of the cathode and the anode protrude outward from the battery in a state in which the electrode tabs are connected to additional leads.

The battery cells constitute a unit module configured in a structure in which one or more battery cells are surrounded by a high-strength cell cover made of a synthetic resin or a metal material. The high-strength cell cover protects the battery cells, the mechanical strength of which is low, and restrains the deformation of the battery cells due to repetitive expansion and contraction of the battery cells during the charge and discharge of the battery cells to prevent sealing portions of the respective battery cells from being separated from each other. Therefore, it is possible to manufacture a middle- or large-sized battery module having more excellent safety.

Battery cells in a unit module or battery cell of a unit module and another battery cell of another neighboring unit module are connected in series and/or in parallel to each other. For example, electrode terminals of the battery cells may be coupled to each other in a state in which the electrode terminals are arranged in series in the longitudinal direction of the battery cells such that the electrode terminals are continuously disposed adjacent to each other, two or more battery cells are folded in a stacked structure, and the folded battery cells are surrounded by a cell cover, to manufacture a plurality of unit modules.

The electrode terminals of the battery cells may be coupled to each other using various methods, such as welding, soldering, and mechanical coupling. Preferably, the electrode terminals of the battery cells are coupled to each other by welding.

A battery cell stack, in which electrode terminals of battery cells are connected to each other and in which the battery cells are stacked with high integration, are vertically mounted in upper and lower cases which are coupled to each other in an assembly structure, for example.

The upper and lower cases are configured in a structure in which the upper and lower cases surround only the outer circumference of the battery cell stack, and therefore, most of the outside of the battery cell stack is exposed to the outside, preferably, so as to achieve easy dissipation of heat from the battery cell stack in a state in which the upper and lower cases are coupled to each other. As previously described, therefore, the upper case is configured to surround one side of the battery cell stack and to surround a portion of the upper end and a portion of the lower end of the battery cell stack, and the lower case is configured to surround the other side of the battery cell stack and to surround a portion of the upper end and a portion of the lower end of the battery cell stack.

In a preferred example, the module case may include (a) an upper case configured to surround one side of a battery cell stack constituted by the battery cells or the unit modules and to surround a portion of the upper end and a portion of the lower end of the battery cell stack, the upper case being provided at the front thereof with external input and output terminals, and (b) a lower case coupled to the upper case, the lower case being configured to surround the other side of the battery cell stack and to surround a portion of the upper end and a portion of the lower end of the battery cell stack, the lower case being provided at the front thereof with bus bars for connecting electrode terminals of the battery cell stack to the external input and output terminals.

Since the module case includes two members, i.e., the upper case and the lower case, the assembly efficiency between the upper case and the lower case is improved, and repair and maintenance works may be easily carried out when the battery cell stack is defective.

Also, the upper case and the lower case are configured in a structure in which the upper case and the lower case surround only the outer circumference of the battery cell stack such that the outsides of the battery cell stack are exposed out of the upper case and the lower case, thereby improving heat dissipation efficiency of the battery cell stack.

The lower case may be provided at the lower end of the front and/or the rear thereof with a coupling part, by which the lower case is fixed to an external device, the coupling part having a through hole formed in a center thereof.

The middle- or large-sized battery module according to the present invention is configured in an overall compact structure, and structurally stable mechanical coupling and electrical connection are achieved without using a large number of members. Also, predetermined numbers of battery cells, such as four, six, eight, and ten, are used to constitute a battery module. Consequently, it is possible to effectively install a necessary number of battery modules in a limited space.

In accordance with another aspect of the present invention, therefore, there is provided a middle- or large-sized battery system, having high power and large capacity, manufactured by connecting a plurality of battery modules with the above-stated construction as unit bodies.

The middle- or large-sized battery system according to the present invention may be manufactured by combining battery modules based on desired power and capacity. The battery system may be used as a power source for electric vehicles, hybrid electric vehicles, or plug-in hybrid electric vehicles, safety of which is regarded as important.

In accordance with a further aspect of the present invention, there is provided a wire type connection member for middle- or large-sized battery modules used to transmit voltage and/or temperature signals measured from a battery module including a plurality of battery cells or unit modules to a battery management system (BMS) for monitoring and controlling an operation of the battery module.

Specifically, one end of the connection member is configured in a plug or cap structure connected to a connector of the BMS in a male and female engagement type mechanical coupling manner, and the connection member has a downwardly bent region (a downwardly bent portion) formed at a region adjacent to a connection part such that the downwardly bent portion is bent downward to a height lower than the connection part for preventing moisture condensed on the connection member from being introduced to the connection part due to gravity.

Since the connection member is configured in the plug or cap structure, as described above, it is possible to easily achieve mechanical coupling between the connection member and the connector of the BMS in the male and female coupling manner.

Also, since the connection member has a downwardly bent region (a downwardly bent portion) formed at a region adjacent to the connection part such that the downwardly bent portion is bent downward to a height lower than the connection part, it is possible to easily prevent the occurrence of a short circuit at the connection part as a result of the introduction of moisture condensed on the connection member to the connection part due to gravity.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
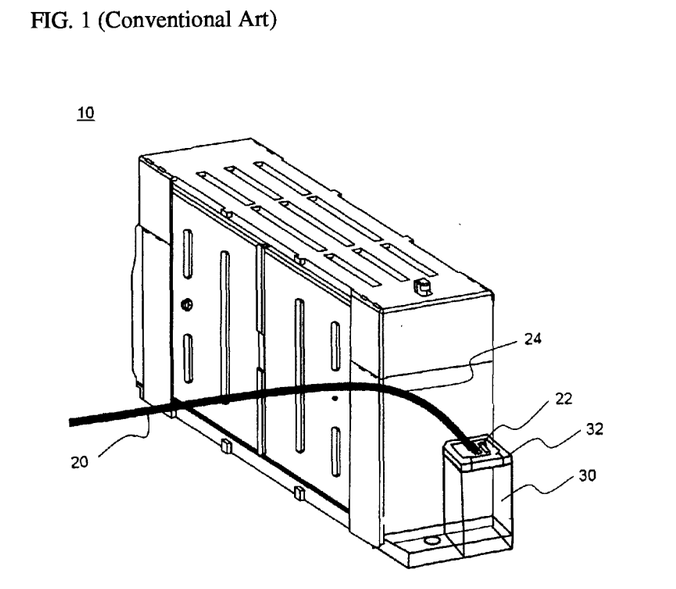
FIG. 1 is a typical view illustrating a middle- or large-sized battery module using a conventional wire type connection member.

FIG. 1 is a typical view illustrating a middle- or large-sized battery module using a conventional wire type connection member.

In a middle- or large-sized battery module 10 of FIG. 1, a connection part 22 provided at one end of a wire type connection member 20, which may be a wiring harness, is coupled to a connection counterpart 32 provided at the top of a battery management system (BMS) 30 in a male and female coupling manner.

In this structure, however, moisture condensed on the surface of the wire type connection member 20 flows from the uppermost end 24 of the wire type connection member 20 to the connection part 22 due to gravity, with the result that a short circuit may occur at a coupling region between the connection part 22 and the connection counterpart 32.

Figure 2:
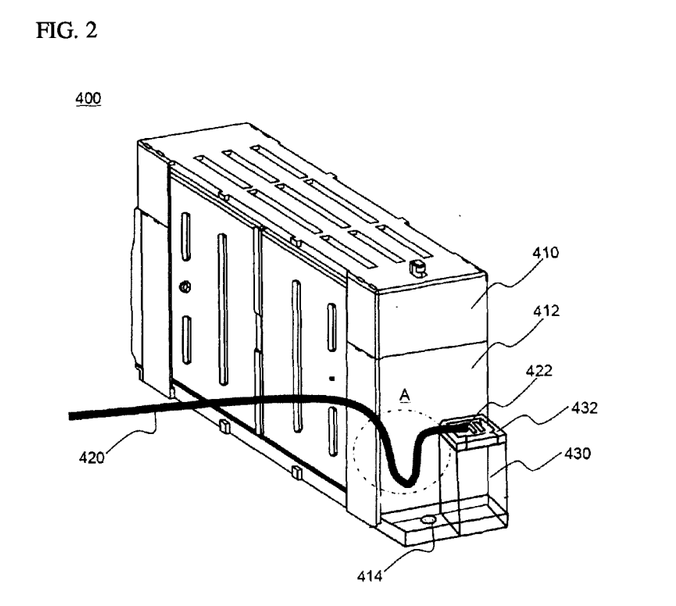
FIG. 2 is a typical view illustrating a middle- or large-sized battery module according to an embodiment of the present invention.
Figure 3:
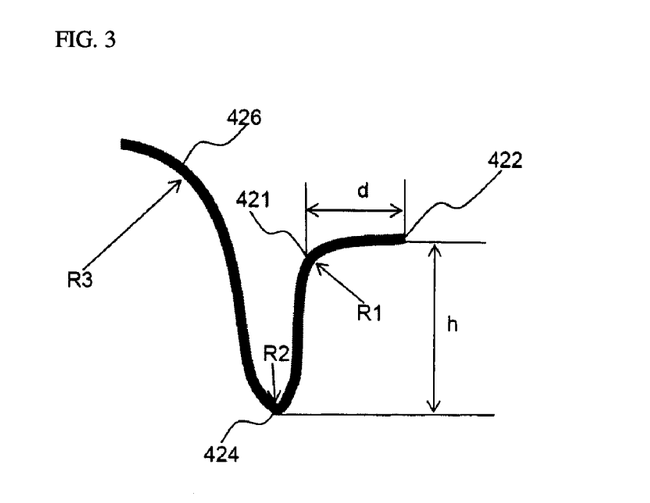
FIG. 3 is an enlarged typical view illustrating a downwardly bent portion of FIG. 2.

FIG. 2 is a typical view illustrating a middle- or large-sized battery module according to an embodiment of the present invention, and FIG. 3 is an enlarged typical view illustrating a downwardly bent portion of FIG. 2.

Referring to these drawings, a middle- or large-sized battery module 400 is configured in a structure in which a battery cell stack including a plurality of unit modules connected in series to each other while standing in the lateral direction thereof is mounted in a module case.

The module case includes an upper case 410 configured to surround one side of the battery cell stack and to surround a portion of the upper end and a portion of the lower end of the battery cell stack, the upper case 410 being provided at the front thereof with external input and output terminals, and a lower case 412 coupled to the upper case 410, the lower case 412 being configured to surround the other side of the battery cell stack and to surround a portion of the upper end and a portion of the lower end of the battery cell stack, the lower case 412 being provided at the front thereof with bus bars for connecting electrode terminals of the battery cell stack to the external input and output terminals.

The lower case 412 is provided at the lower end of the rear thereof with a coupling part, having a through hole 414 formed in the middle thereof, configured to be fixed to an external device.

One end, i.e., a connection part 422, of a wire type connection member 420 for transmitting and receiving measured voltage and/or temperature signals of the unit modules is electrically connected to a connection counterpart 432 provided at the top of a socket 430 in a mechanical coupling manner, e.g., a male and female coupling manner. The other end of the wire type connection member 420 is connected to a BMS (not shown) that processes the measured signals.

The wire type connection member 420 has a downwardly bent portion A, which is bent downward from a position d spaced apart from the connection part 422 by approximately 2 cm to a height h lower than the connection part 422 by approximately 5 cm. Consequently, it is possible to prevent moisture condensed on the connection member 420 from being introduced to the connection part 422 due to gravity.

The downwardly bent portion A is configured in a structure in which a first vertical bent point 421, a horizontal bent point 424, and a second vertical bent point 426 are continuously disposed from the connection part 422. The downwardly bent portion A is configured in a semi-elliptical shape on a plane.

For example, the first vertical bent point 421 may have a radius R1 of approximately 2 cm, the second vertical bent point 426 may have a radius R3 of approximately 3 cm, and the horizontal bent point 424 may have a radius R2 of approximately 0.5 cm. However, the radii of the bent points may be appropriately decided in consideration of internal resistances of the bent points and restoring degrees of the bent points.

Figure 4:
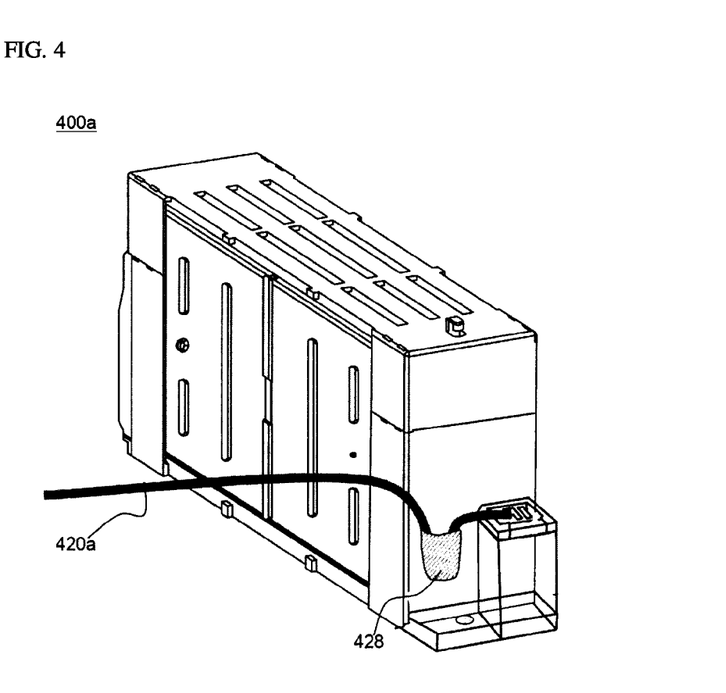
FIG. 4 is a typical view illustrating a middle- or large-sized battery module using another embodiment of a wire type connection member shown in FIG. 2.

FIG. 4 is a typical view illustrating a middle- or large-sized battery module using another embodiment of the wire type connection member shown in FIG. 2.

Referring to FIG. 4 together with FIG. 2, a middle- or large-sized battery module 400a is identical in structure to the middle- or large-sized battery module shown in FIG. 2 except that a downwardly bent portion of a wire type connection member 420a is surrounded by an insulative band 428 for preventing the downwardly bent portion of the wire type connection member 420a from being restored to the original state thereof, and the insulative band 428 is configured in a cap shape, the upper part of which is open, for surrounding the downwardly bent portion. Therefore, a detailed description of the middle- or large-sized battery module 400a will not be given.

Figure 5:
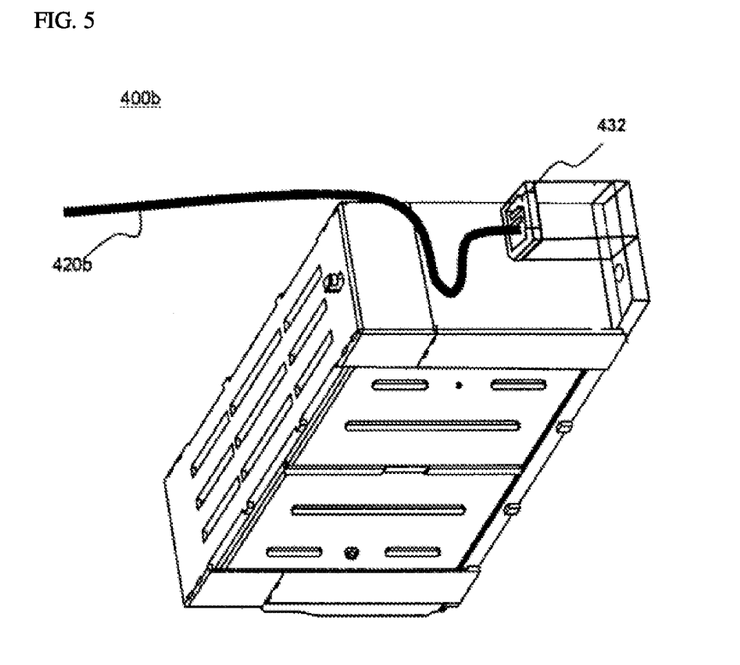
FIGS. 5 and 6 are typical views illustrating middle- or large-sized battery modules according to other embodiments of the present invention.
Figure 6:
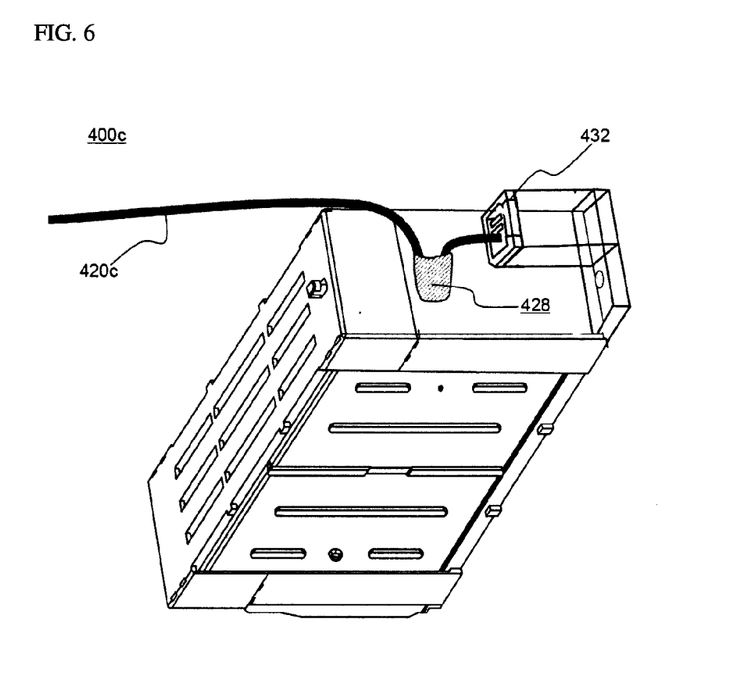

FIGS. 5 and 6 are typical views illustrating middle- or large-sized battery modules according to other embodiments of the present invention.

A middle- or large-sized battery module 400b shown in FIG. 5 is identical in structure to the middle- or large-sized battery module 400 shown in FIG. 2 except that the wire type connection member 420 of FIG. 2 is connected in parallel to the connection counterpart 432.

A middle- or large-sized battery module 400c shown in FIG. 6 is identical in structure to the middle- or large-sized battery module 400a shown in FIG. 4 except that the wire type connection member 420a of FIG. 4 is connected in parallel to the connection counterpart 432.

Figure 7:
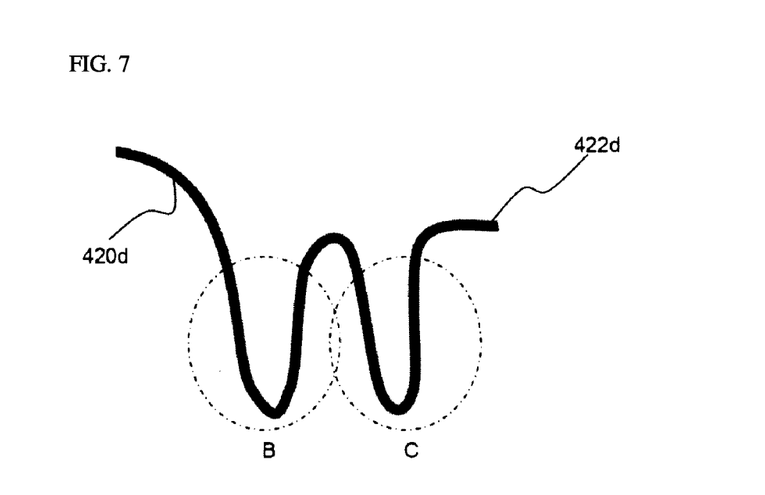
FIG. 7 is a typical view illustrating a wire type connection member according to another embodiment of the present invention.

FIG. 7 is a typical sectional view illustrating a wire type connection member according to another embodiment of the present invention.

A wire type connection member 420d of FIG. 7 is different in structure from the wire type connection member 420 of FIG. 3 in that two downwardly bent portions B and C are continuously formed. In this structure, it is also possible to prevent moisture condensed on the connection member 420d from being introduced to a connection part 422d due to gravity. Consequently, wire type connection member 420d of FIG. 7 provides the same effect as the wire type connection member 420 of FIG. 3.

Figure 8:
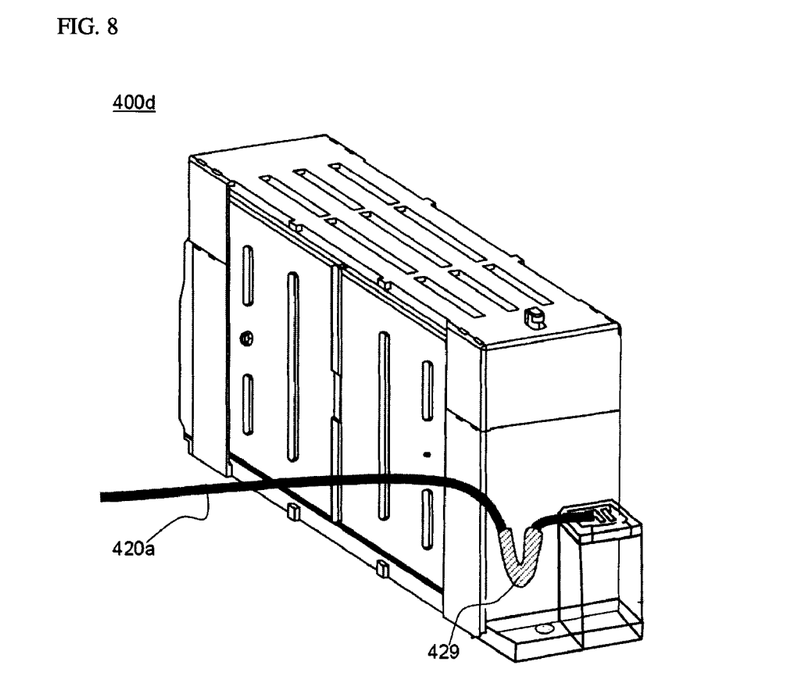
FIG. 8 is a typical view illustrating a middle- or large-sized battery module using another embodiment of a wire type connection member shown in FIG. 2.

FIG. 8 is a typical view illustrating a middle- or large-sized battery module using another embodiment of a wire type connection member shown in FIG. 2.

Referring to FIG. 8 together with FIG. 2, a middle- or large-sized battery module 400d is characterized in that an insulative band 429 is configured in the shape of a hollow pipe for surrounding a wire corresponding to a downwardly bent portion of a wire type connection member 420a, and the hollow pipe is filled with a moisture absorbing material, such as silica gel. Alternatively, the moisture absorbing material may be applied to the inside of the hollow pipe.

Figure 9:
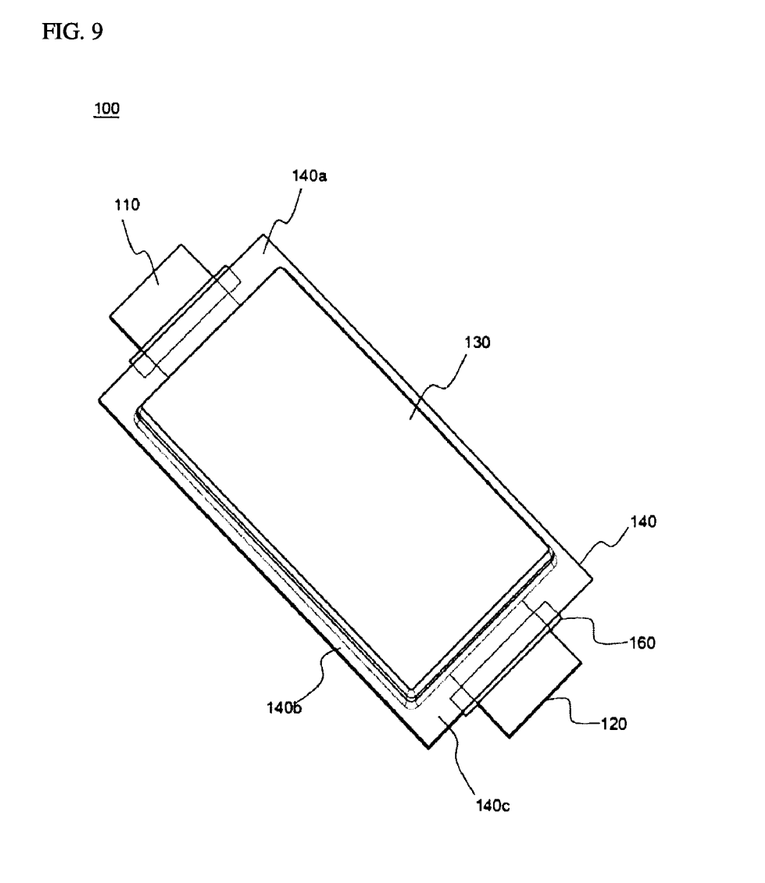
FIG. 9 is a perspective view illustrating a representative pouch-shaped battery.

FIG. 9 is a perspective view typically illustrating a representative pouch-shaped battery. A pouch-shaped battery 100 of FIG. 9 is configured in a structure in which two electrode leads 110 and 120 protrude outward from the upper end and the lower end of a battery body 130 while being opposite to each other. A sheathing member 140 includes upper and lower sheathing parts. An electrode assembly (not shown) is received in a receiving part, which is defined between the upper and lower sheathing parts of the sheathing member 140. Opposite sides 140b and upper and lower ends 140a and 140c, which are contact regions of the upper and lower sheathing parts of the sheathing member 140, are bonded to each other, whereby the pouch-shaped battery 100 is manufactured. The sheathing member 140 is configured in a laminate structure of a resin layer/a metal film layer/a resin layer. Consequently, it is possible to bond the opposite sides 140b and upper and lower ends 140a and 140c of the upper and lower sheathing parts of the sheathing member 140, which are in contact with each other, to each other by applying heat and pressure to the opposite sides 140b and upper and lower ends 140a and 140c of the upper and lower sheathing parts of the sheathing member 140 so as to weld the resin layers to each other. According to circumstances, the opposite sides 140b and upper and lower ends 140a and 140c of the upper and lower sheathing parts of the sheathing member 140 may be bonded to each other using a bonding agent. For the opposite sides 140b of the sheathing member 140, the same resin layers of the upper and lower sheathing parts of the sheathing member 140 are in direct contact with each other, whereby uniform sealing at the opposite sides 140b of the sheathing member 140 is accomplished by welding. For the upper and lower ends 140a and 140b of the sheathing member 140, on the other hand, the electrode leads 110 and 120 protrude outward from the upper and lower ends 140a and 140b of the sheathing member 140. For this reason, the upper and lower ends 140a and 140c of the upper and lower sheathing parts of the sheathing member 140 are thermally welded to each other, while a film-shaped sealing member 160 is interposed between the electrode leads 110 and 120, in consideration of the thickness of the electrode leads 110 and 120 and the difference in material between the electrode leads 110 and 120 and the sheathing member 140, so as to increase sealability.

Figure 10:
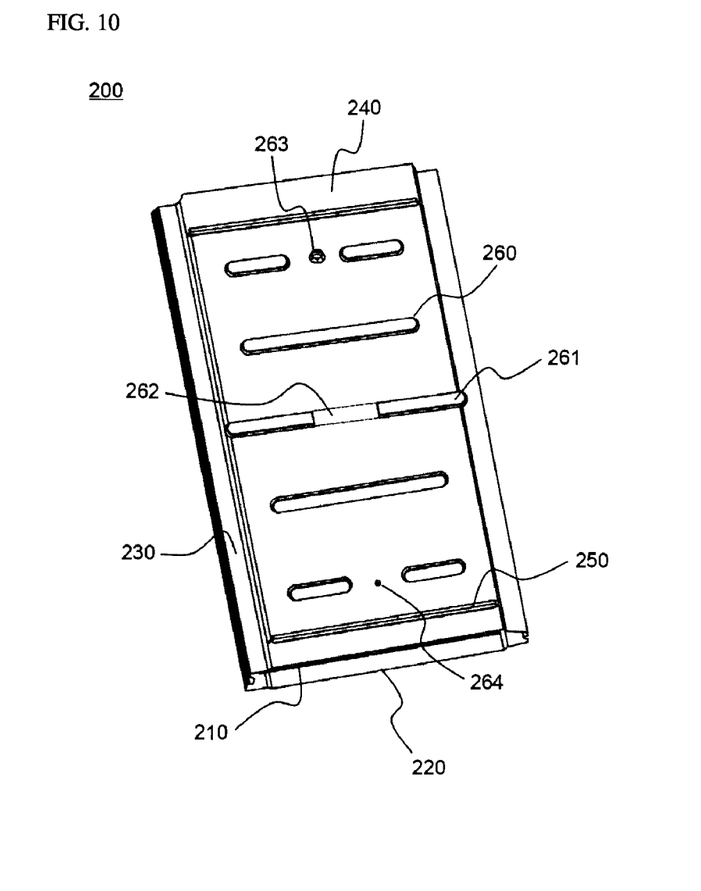
FIG. 10 is a perspective view illustrating a pair of cell covers constituting each unit module shown in FIG. 2.

FIG. 10 is a perspective view illustrating a pair of cell covers constituting each unit module shown in FIG. 2.

Referring to FIG. 10, cell covers 200 have two pouch-shaped battery cells, one of which is shown in FIG. 9, mounted therein for reinforcing the mechanical strength of the pouch-shaped battery cells and for enabling the pouch-shaped battery cells to be easily mounted to a module case (not shown). Corresponding electrode terminals of the two battery cells are connected in series to each other, and then the connected electrode terminals are bent such that the battery cells are in tight contact with each other. After that, the battery cells are mounted in the cell covers 200.

The cell covers 200 include a pair of members 210 and 220 which are coupled to each other. Each of the members 210 and 220 is made of a high-strength metal sheet. The cell covers 200 are provided at the left and right sides thereof with steps 230 for achieving easy fixing of the battery module. Also, the cell covers 200 are provided at the upper and lower ends thereof with steps 240 for achieving easy fixing of the battery module in the same manner. In addition, the cell covers 200 are provided at regions adjacent to the upper and lower ends thereof with lateral fixing parts 250 for achieving easy mounting of a module case (not shown).

At the outsides of the cell covers 200 are formed a plurality of linear protrusions 260, which are spaced apart from one another in the longitudinal direction of the cell covers 200. A depression 262 is formed at a middle one of the protrusions, i.e., a protrusion 261 such that a thermistor (not shown) is mounted in the depression 262. Also, a projection 263 is formed at an upper end one of the protrusions, and another projection 264, which is configured in a shape reverse to the shape of the projection 263, is formed at a lower end one of the protrusions.

Figure 11:
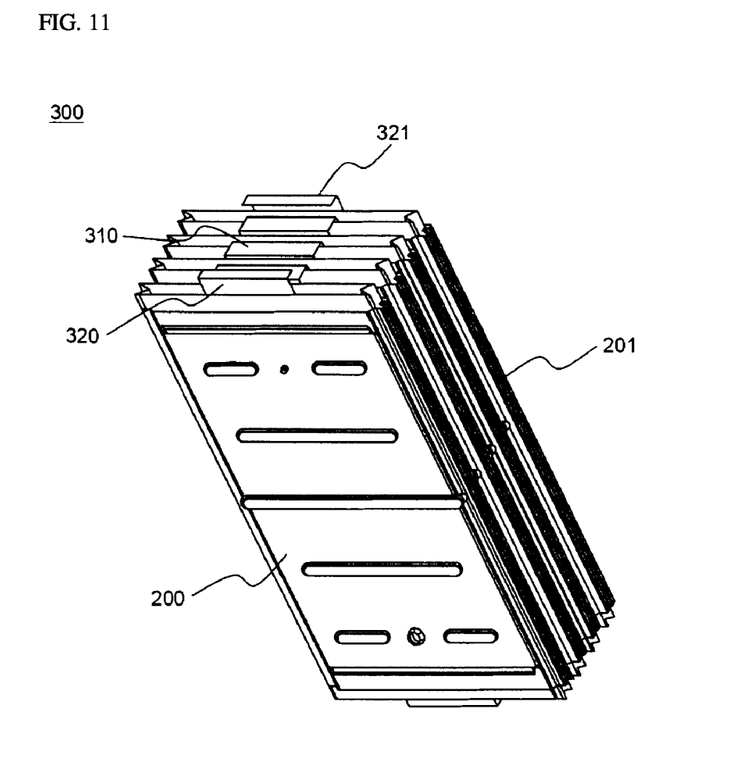
FIG. 11 is a perspective view illustrating a battery cell stack constituted by a plurality of unit modules.

FIG. 11 is a perspective view illustrating a battery cell stack 300 constituted by a plurality of unit modules.

Referring to FIG. 11, a battery cell stack 300 includes four unit modules 200 and 201. Each of the unit modules 200 has two battery cells (not shown) mounted therein. Therefore, the battery cell stack 300 includes a total of eight battery cells. Electrode terminals between the respective battery cells are connected in series to each other, and electrode terminals between the respective unit modules are also connected in series to each other. Electrode terminal connections 310 are bent in a '[' shape in section to configure the battery cell stack. Outside electrode terminals 320 and 321 of the outermost unit modules 200 and 201 are bent inward in a '¬' shape in section in a state in which the outside electrode terminals 320 and 321 protrude slightly more than the other electrode terminal connections 310.

INDUSTRIAL APPLICABILITY

As is apparent from the above description, the middle- or large-sized battery module according to the present invention includes a wire type connection member having a downwardly bent portion formed at a region adjacent to a connection part such that the downwardly bent portion is bent downward to a height lower than the connection part. Consequently, it is possible to easily prevent the occurrence of a short circuit between the connection part and a connection counterpart due to moisture even in a case in which the connection part of the wire type connection member does not have a waterproof function.

Also, the specific structure of the wire type connection member as described above enables voltage, temperature, etc. of the battery cells to be stably measured and prevents the occurrence of abnormal deviation between the battery cells, thereby improving the safety of the middle- or large-sized battery module.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery module including a plurality of battery cells or unit modules, the battery module being configured to have a connection structure in which measured voltage and/or temperature signals of the battery cells or the unit modules are transmitted and received by a wire type connection member, wherein at least one end of the connection member is connected to a connection counterpart in a male and female engagement type mechanical coupling manner, the connection member has a downwardly bent region (a downwardly bent portion) formed at a region adjacent to a connection part such that the downwardly bent portion is bent downward to a height lower than the connection part for preventing moisture condensed on the connection member from being introduced to the connection part due to gravity,
wherein a lower end of the downwardly bent portion is spaced apart from the connection part by 1 to 10 cm, the downwardly bent portion is located at a height 0.5 to 10 cm lower than the connection part, and the downwardly bent portion is configured in a structure in which a first vertical bent point, a horizontal bent point, and a second vertical bent point are continuously disposed, and
wherein an insulative band is configured in a cap shape, an upper part of which is open, for surrounding the downwardly bent portion or in a shape of a hollow pipe for surrounding a wire corresponding to the downwardly bent portion.

2. The battery module according to claim 1, wherein the battery module is configured in a structure in which a battery cell stack including a plurality of battery cells or unit modules connected in series to each other while standing in a lateral direction thereof is mounted in a module case.

3. The battery module according to claim 1, wherein the connection counterpart is located at a battery management system (BMS) for monitoring and controlling an operation of the battery module.

4. The battery module according to claim 1, wherein the downwardly bent portion is configured in a semi-elliptical shape on a plane.

5. The battery module according to claim 1, wherein the bent points have radii of 0.3 to 3 cm.

6. The battery module according to claim 1, wherein the downwardly bent portion is surrounded by the insulative band for preventing the downwardly bent portion from being restored to an original state thereof.

7. The battery module according to claim 1, wherein the connection member is a wiring harness.

8. The battery module according to claim 1, wherein the end of the connection member is configured in a shape of a plug or cap type connector for connection with the connection counterpart.

9. The battery module according to claim 1, wherein the connection member has two or more downwardly bent portions which are continuously formed.

10. The battery module according to claim 1, wherein the unit cell stack includes a plurality of unit modules each including plate-shaped battery cells each having electrode terminals formed at an upper end and a lower end thereof, and each of the unit modules includes two or more battery cells configured in a structure in which electrode terminals of the battery cells are connected in series to each other and connections between the electrode terminals are bent, the battery cells being stacked, and a pair of cell covers coupled to each other for surrounding outsides of the battery cells excluding the electrode terminals of the battery cells.

11. The battery module according to claim 1, wherein the module case includes:
an upper case configured to surround one side of a battery cell stack constituted by the battery cells or the unit modules and to surround a portion of an upper end and a portion of a lower end of the battery cell stack, the upper case being provided at a front thereof with external input and output terminals, and
a lower case coupled to the upper case, the lower case being configured to surround the other side of the battery cell stack and to surround a portion of the upper end and a portion of the lower end of the battery cell stack, the lower case being provided at a front thereof with bus bars for connecting electrode terminals of the battery cell stack to the external input and output terminals.

12. The battery module according to claim 11, wherein the lower case is provided at a lower end of the front and/or a rear thereof with a coupling part, by which the lower case is fixed to an external device, the coupling part having a through hole formed in a center thereof.

13. A battery system manufactured using the battery module according to claim 1 as a unit body.

14. The battery system according to claim 13, wherein the battery system is used as a power source for electric vehicles, hybrid electric vehicles, or plug-in hybrid electric vehicles.

15. The battery module according to claim 1, wherein the cap is filled with a moisture absorbing material, or the moisture absorbing material is applied to an inside of the cap.

16. The battery module according to claim 1, wherein the hollow pipe is filled with a moisture absorbing material, or the moisture absorbing material is applied to an inside of the hollow pipe.

17. The battery module according to claim 1, wherein the horizontal bent point is covered by the cap or the hollow tube.

\* \* \* \* \*